United States Patent
Atanassova et al.

(10) Patent No.: US 9,985,281 B2
(45) Date of Patent: May 29, 2018

(54) CARBONACEOUS MATERIALS FOR LEAD ACID BATTERIES

(71) Applicant: Cabot Corporation, Boston, MA (US)

(72) Inventors: Paolina Atanassova, Waltham, MA (US); Aurelien L. DuPasquier, Westford, MA (US); Kenneth C. Koehlert, Hollis, NH (US); Berislav Blizanac, Acton, MA (US); Andriy Korchev, Westford, MA (US); Yipeng Sun, West Windsor, NJ (US)

(73) Assignee: Cabot Corporation, Boston, MA (US)

( * ) Notice: Subject to any disclaimer, the term of this patent is extended or adjusted under 35 U.S.C. 154(b) by 51 days.

(21) Appl. No.: 15/190,871

(22) Filed: Jun. 23, 2016

(65) Prior Publication Data

US 2016/0380261 A1    Dec. 29, 2016

Related U.S. Application Data

(60) Provisional application No. 62/183,961, filed on Jun. 24, 2015.

(51) Int. Cl.

| | | |
|---|---|---|
| *H01M 4/36* | (2006.01) | |
| *H01M 4/04* | (2006.01) | |
| *H01M 4/57* | (2006.01) | |
| *H01M 4/60* | (2006.01) | |
| *H01M 4/62* | (2006.01) | |
| *H01M 4/66* | (2006.01) | |
| *H01M 4/14* | (2006.01) | |
| *H01M 10/08* | (2006.01) | |
| *H01M 10/06* | (2006.01) | |
| *H01M 4/583* | (2010.01) | |
| *H01M 4/02* | (2006.01) | |

(52) U.S. Cl.
CPC ......... *H01M 4/364* (2013.01); *H01M 4/0419* (2013.01); *H01M 4/0471* (2013.01); *H01M 4/14* (2013.01); *H01M 4/57* (2013.01); *H01M 4/583* (2013.01); *H01M 4/60* (2013.01); *H01M 4/606* (2013.01); *H01M 4/622* (2013.01); *H01M 4/625* (2013.01); *H01M 4/627* (2013.01); *H01M 4/628* (2013.01); *H01M 4/663* (2013.01); *H01M 10/06* (2013.01); *H01M 10/08* (2013.01); *H01M 2004/021* (2013.01)

(58) Field of Classification Search
CPC .. H01M 4/364; H01M 4/0419; H01M 4/0471; H01M 4/14; H01M 4/57; H01M 4/583; H01M 4/60; H01M 4/606; H01M 4/622; H01M 4/625; H01M 4/627; H01M 4/628; H01M 10/06; H01M 10/08; H01M 2004/021

See application file for complete search history.

(56) References Cited

U.S. PATENT DOCUMENTS

| | | | |
|---|---|---|---|
| 4,086,392 A | | 4/1978 | Mao et al. |
| 4,119,772 A | * | 10/1978 | Peters ................ H01M 2/02 |
| | | | 429/204 |
| 7,923,151 B2 | | 4/2011 | Lam et al. |
| 2004/0018427 A1 | | 1/2004 | Monconduit |
| 2007/0160899 A1 | | 7/2007 | Atanassova et al. |
| 2009/0208780 A1 | | 8/2009 | Sun et al. |
| 2010/0203362 A1 | | 8/2010 | Lam et al. |
| 2012/0115031 A1 | * | 5/2012 | Atanassova ........... H01M 4/14 |
| | | | 429/228 |
| 2012/0248383 A1 | | 10/2012 | Atanassova et al. |
| 2014/0093775 A1 | * | 4/2014 | Hardman ............ H01M 4/20 |
| | | | 429/215 |

FOREIGN PATENT DOCUMENTS

| | | | |
|---|---|---|---|
| CN | 1485943 A | | 3/2004 |
| CN | 1964108 A | | 5/2007 |
| CN | 101941697 A | | 1/2011 |
| CN | 102891295 A | | 1/2013 |
| CN | 103022477 A | | 4/2013 |
| GB | 12583217 A | * | 7/1972 |
| JP | 09161802 A | * | 6/1997 |
| JP | 2006155901 A | * | 6/2006 |
| WO | WO 2005/028569 A2 | | 3/2005 |
| WO | WO 2010/058240 A1 | | 5/2010 |
| WO | WO 2013/046499 A1 | | 4/2013 |
| WO | WO 2013/096784 A1 | | 6/2013 |

OTHER PUBLICATIONS

Mahato "Aspects of the Role of Lignin Additives in Pasted Lead Electrodes"; J. Electrochem. Soc.: Electrochemical Science and Technology; vol. 124, No. 11, pp. 1663-1667. (Year: 1977).*

* cited by examiner

*Primary Examiner* — Gregg Cantelmo

(57) ABSTRACT

Disclosed herein are compositions, which can be used to coat electrode plates, comprising at least one carbonaceous material and at least one additive, wherein the at least one additive comprises a metal ion selected from calcium, barium, potassium, magnesium, and strontium ion, and wherein the metal ion is present in an amount ranging from 0.5 wt. % to 3 wt. % relative to the total weight of carbonaceous material. Also disclosed are electrodes and lead acid batteries comprising such compositions, and methods of making the compositions.

14 Claims, 5 Drawing Sheets

CARBONACEOUS MATERIALS FOR LEAD ACID BATTERIES

RELATED APPLICTIONS

This application claims priority to U.S. Provisional Application No. 62/183,961, filed Jun. 24, 2015, the disclosure of which is incorporated herein by reference.

FIELD OF THE INVENTION

Disclosed herein are compositions comprising carbonaceous materials and at least one additive, where the compositions can be useful in electrodes for lead acid batteries.

BACKGROUND

There has been increasing use in the addition of carbonaceous materials to lead acid battery compositions (e.g., anode compositions). It is has been discovered that the carbon can improve charge acceptance and cycle life. However, the presence of carbon can result in increased water loss during high temperature overcharge conditions relevant for automotive applications and stationary applications under overcharge voltage. Accordingly, there is a continuing need to develop new additives for lead acid batteries that achieve suitable charge acceptance and cycle life while preventing increased water loss.

SUMMARY

One embodiment provides an electrode plate coated with a composition comprising at least one carbonaceous material and at least one additive, wherein the at least one additive comprises a metal ion selected from calcium, barium, potassium, magnesium, and strontium ion, and wherein the metal ion is present in an amount ranging from 0.5 wt. % to 3 wt. % relative to the total weight of carbonaceous material.

Another embodiment provides a composition comprising at least one carbonaceous material and at least one metal lignosulfonate, wherein the at least one metal lignosulfonate is selected from calcium, barium, potassium, magnesium, and strontium lignosulfonates, and the metal ion of the at least one metal lignosulfonate is present in an amount ranging from 0.5 wt. % to 3 wt. % relative to the total weight of carbonaceous material. One embodiment provides an electrode plate coated with this composition.

Another embodiment provides a method of making a composition comprising at least one carbonaceous material and at least one additive, comprising:

combining the at least one carbonaceous material with at least one additive precursor to form a mixture, wherein the at least one additive precursor comprises a metal ion selected from calcium, barium, potassium, magnesium, and strontium ion, and wherein the metal ion is present in an amount ranging from 0.5 wt. % to 3 wt. % relative to the total weight of the at least one carbonaceous material; and subjecting the mixture to at least one process selected from heat treatment and spray drying to form the composition.

Another embodiment provides a method of making a composition comprising at least one carbonaceous material and at least one metal lignosulfonate, comprising:

combining the at least one metal lignosulfonate with the at least one carbonaceous material to form a mixture, wherein the at least one metal lignosulfonate is selected from calcium, barium, potassium, magnesium, and strontium lignosulfonates, and the metal ion of the at least one metal lignosulfonate is present in an amount ranging from 0.5 wt. % to 3 wt. % relative to the total weight of carbonaceous material; and subjecting the mixture to at least one process selected from heat treatment and spray drying to form the composition.

Another embodiment provides a method of making a composition for a lead acid battery, comprising:

combining at least one lead-containing material and an organic molecule expander with a composition comprising at least one carbonaceous material and at least one additive, wherein the at least one additive comprises a metal ion selected from calcium, barium, potassium, magnesium, and strontium ion, and wherein the metal ion is present in an amount ranging from 0.5 wt. % to 3 wt. % relative to the total weight of carbonaceous material.

Another embodiment provides a method of making a composition for a lead acid battery, comprising:

combining at least one lead-containing material and an organic molecule expander to form a mixture; and combining the mixture with a composition comprising at least one carbonaceous material and at least one additive, wherein the at least one additive comprises a metal ion selected from calcium, barium, potassium, magnesium, and strontium ion, and wherein the metal ion is present in an amount ranging from 0.5 wt. % to 3 wt. % relative to the total weight of carbonaceous material.

DETAILED DESCRIPTION

Figure 1:
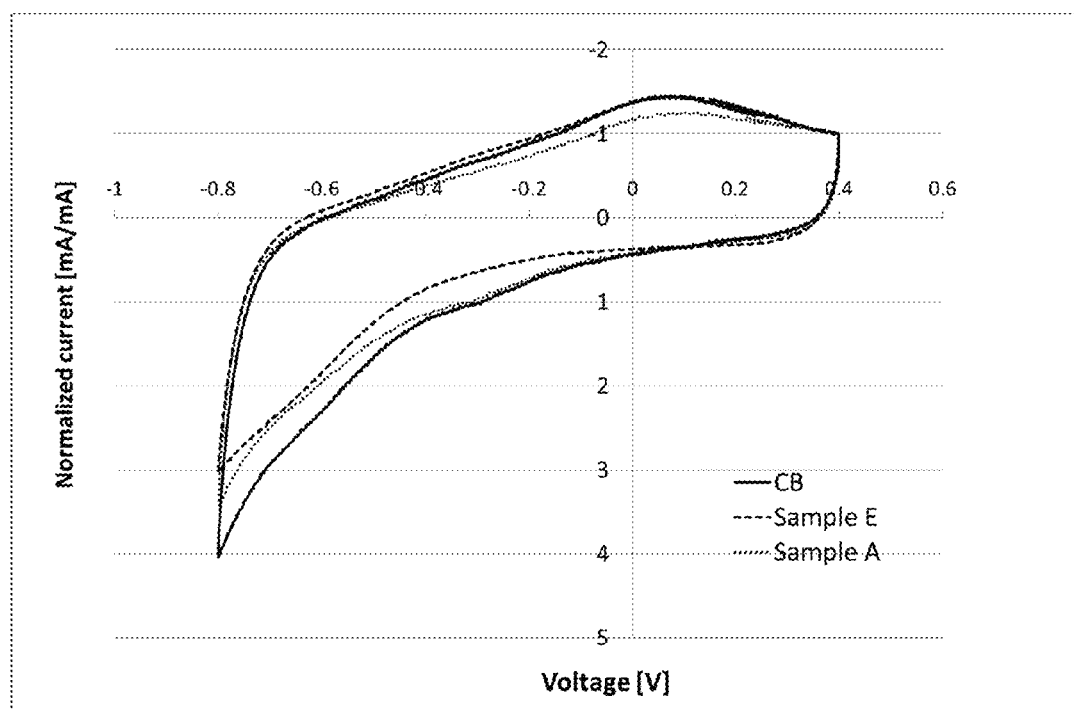
FIG. 1 is a plot of the final cyclic voltammetry cycles (normalized current [mA/mA] vs. voltage, [V]) for coated graphite rods coated with the composites of Example 3 in comparison to an unmodified carbon black.

Disclosed herein are carbonaceous materials incorporating certain additives, which can have applications in lead acid batteries.

One embodiment provides a composition comprising (or consisting essentially of, or consisting of) at least one carbonaceous material and at least one additive, wherein the at least one additive comprises a metal ion selected from calcium, barium, potassium, magnesium, and strontium ion, and wherein the metal ion is present in an amount ranging from 0.5 wt. % to 3 wt. % relative to the total weight of carbonaceous material. This composition is also referred to herein as a carbonaceous material/additive composition. In one embodiment, the at least one carbonaceous material is interspersed with the at least one additive. For example, both the at least one carbonaceous material and at least one additive are particulate where the at least one carbonaceous material is interspersed (e.g., homogeneously interspersed) with the at least one additive. In one embodiment, the at least one carbonaceous material and at least one additive form a physical admixture, e.g., a free-flowing powder.

In one embodiment, the composition comprises a particulate composite comprising (or consisting essentially of, or consisting of) at least one carbonaceous material having on its surface at least one additive. As used herein, a "particulate composite" refers to solid particles in which each particle comprises the at least one carbonaceous material and the at least one additive. A composite is distinguished from a physical admixture of the carbonaceous material and the at least one additive in that the composite comprises the at least one additive adhered to the least one carbonaceous material. For example, the surface of the at least one carbonaceous material has on its surface the at least one additive in which the at least one additive is adsorbed to, coated on, and/or impregnated with (e.g., within pores, cavities, etc.) the surface of the carbonaceous material. In one embodiment, the at least one carbonaceous material is impregnated with the at least one additive.

One embodiment provides an electrode plate coated with the compositions described herein. In general, the addition of carbon to a negative electrode plate can improve charge acceptance and cycle life of the lead acid battery. Charge acceptance and cycle life of lead acid batteries are limited by formation of large crystals of lead sulfate, which have a more thermodynamically favorable surface to volume ratio. As the surface to volume ratio of the formed lead sulfate crystals declines, the ability of the negative electrode to reverse the reduction of $PbSO_4$ back to lead is impaired, especially on the short time scales typically associated with rapid charge, and consequently the charge acceptance deteriorates. Formation of large lead sulfate crystals thus results in kinetic irreversibility in charge and discharge rates, a condition known as "sulfation." Excessive accumulation of kinetically irreversible lead sulfate crystals in turn results in deterioration of the negative plate/electrode structure, which can lead to premature failure and loss of cycle life.

The addition of a carbonaceous material (e.g. carbon black, graphite, activated carbon, or other forms of carbon such as graphenes or carbon nanotubes) can result in modification of the negative electrode morphology to improve kinetic reversibility in formation and dissolution of formed lead sulfate crystals and preserved electrode stability during multiple cycles of charge and discharge, and thereby can improve charge acceptance and cycle life. However, modified negative electrode morphology may result in elevated rate of water electrolysis and overall increased rate of water loss, especially in overcharge conditions. In one embodiment, this trade-off is mitigated to improve the benefit of carbon additives in improvement of charge acceptance and cycle life, e.g., by reducing water loss.

It has been discovered that lead acid batteries incorporating the compositions disclosed herein can lead to improved properties (e.g., reduced water loss) compared to batteries containing an unmodified or noncomposite carbon, in which the carbon surface is neither treated, coated, adsorbed, impregnated, nor forms a physical admixture with the at least one additive in the amounts disclosed herein.

In one embodiment, the at least one metal ion of the at least one additive is present in at least one form selected from salts, oxides, nitrides, and sulfides, e.g., the additive can comprise one or more of metal ion salts, metal oxides, metal nitrides, and/or metal sulfides. In one embodiment, the at least one additive comprises the metal ion present as a salt selected from nitrate, nitrite, carbonate, bicarbonate, acetate, phosphate, phosphite, sulfate, sulfite, lignosulfonate, citrate, tartrate, and gluconate salts of the metal ion, e.g., selected from calcium, barium, potassium, magnesium, and strontium. Mixtures of different salts of one or more metal ions are possible. In one embodiment, the metal ion comprises a calcium ion. In one embodiment, the at least one additive is a calcium ion additive, e.g., a calcium salt. In another embodiment, the salt is selected from lignosulfonates. The lignosulfonate can be a calcium lignosulfonate. in one embodiment, more than one type of metal ion can be present in the salt so long at least one metal ion selected from calcium, barium, potassium, magnesium, and strontium ion is present in the salt. For example, the salt can be a calcium/sodium lignosulfonate.

The amount of metal ion present in the composition, e.g., ranging from 0.5 wt. % to 3 wt. % relative to the total weight of carbonaceous material, refers to the total amount of metal ions in the composition, including metal ions inherently present in the carbonaceous material prior to formation of the composition and metal ions provided from an external source. Mixtures of additives (resulting in mixtures of metal ions and/or forms of the metal ions) can be present. The metal ion content can be determined by any method known in the art, e.g., any suitable elemental analysis method such as atomic emission spectroscopy by inductive coupled plasma (AES-ICP). In one embodiment, the metal ion is present in the composition in an amount ranging from 0.5 wt. % to 2.5 wt. % relative to the total weight of carbonaceous material, e.g., from 0.5 wt. % to 2 wt. %, from 0.5 wt. % to 1.5 wt. %, from 0.5 wt. % to 1 wt. %, from 0.6 wt. % to 3 wt. %, from 0.6 wt. % to 2.5 wt. %, from 0.6 wt. % to 2 wt. %, from 0.6 wt. % to 1.5 wt. %, from 0.6 wt. % to 1 wt. %, from 0.7 wt. % to 3 wt. %, from 0.7 wt. % to 2.5 wt. %, from 0.7 wt. % to 2 wt. %, from 0.7 wt. % to 1.5 wt. %, or from 0.7 wt. % to 1 wt. %.

In one embodiment prior to incorporation into the composition, the at least one carbonaceous material is particulate. In one embodiment, the carbonaceous material is selected from carbon black, activated carbon, expanded graphite, graphene, few layer graphene, carbon nanotubes, carbon fibers, carbon nanofibers, and graphite. The carbonaceous material can comprise mixtures of materials, e.g., carbon black and activated carbon.

In another embodiment, the at least one carbonaceous material has a nitrogen surface area (BET) ranging from 1 $m^2/g$ to 3000 $m^2/g$, or from 10 $m^2/g$ to 3000 $m^2/g$, such as surface area ranging from 10 $m^2/g$ to 2500 $m^2/g$, from 10 $m^2/g$ to 2000 $m^2/g$, from 50 $m^2/g$ to 3000 $m^2/g$, from 50 $m^2/g$ to 2500 $m^2/g$ from 50 $m^2/g$ to 2000 $m^2/g$, from 100 $m^2/g$ to 3000 $m^2/g$, or from 100 $m^2/g$ to 2500 $m^2/g$. The BET surface area can be determined according to ASTM-D6556.

In one embodiment, the at least one carbonaceous material is selected from carbon black, e.g., carbon blacks having a BET surface area ranging 30 $m^2/g$ to 3000 $m^2/g$, e.g., from 30 $m^2/g$ to 2000 $m^2/g$, from 30 $m^2/g$ to 1800 $m^2/g$, from 30 $m^2/g$ to 1600 $m^2/g$, from 30 $m^2/g$ to 1200 $m^2/g$, from 30 $m^2/g$ to 1000 $m^2/g$, from 30 $m^2/g$ to 500 $m^2/g$, from 30 $m^2/g$ to 200 $m^2/g$, from 30 $m^2/g$ to 100 $m^2/g$, from 100 $m^2/g$ to 2000 $m^2/g$, from 100 $m^2/g$ to 1800 $m^2/g$, from 100 $m^2/g$ to 1600 $m^2/g$, from 100 $m^2/g$ to 1200 $m^2/g$, from 100 $m^2/g$ to 1000 $m^2/g$, from 100 $m^2/g$ to 500 $m^2/g$, from 100 $m^2/g$ to 200 $m^2/g$, from 500 $m^2/g$ to 2000 $m^2/g$, from 500 $m^2/g$ to 1800 $m^2/g$, from 500 $m^2/g$ to 1600 $m^2/g$, from 500 $m^2/g$ to 1200 $m^2/g$, from 500 $m^2/g$ to 1000 $m^2/g$, or from 1000 $m^2/g$ to 1600 $m^2/g$. In one embodiment, carbon black particles refers to the aggregate of primary particles and not to the primary particles themselves.

In one embodiment, the at least one carbonaceous material comprises carbon black, e.g., carbon black having an OAN ranging from 50 mL/100 g to 500 mL/100 g, e.g., an OAN ranging from 50 mL/100 g to 300 mL/100 g, from 50 mL/100 g to 200 mL/100 g, from 100 mL/100 g to 500 mL/100 g, from 100 mL/100 g to 300 mL/100 g, or from 100 mL/100 g to 220 g/100 mL. OAN can be determined according to ASTM-D2414.

In one embodiment, the at least one carbonaceous material comprises graphite, e.g., graphites having a BET surface area ranging from 1 $m^2/g$ to 50 $m^2/g$.

In one embodiment, the at least one carbonaceous material comprises activated carbon, e.g., activated carbons having a BET surface area ranging from 650 $m^2/g$ to 3000 $m^2/g$, e.g., from 650 $m^2/g$ to 2500 $m^2/g$, from 650 $m^2/g$ to 2000 $m^2/g$, from 1000 $m^2/g$ to 3000 $m^2/g$, from 1000 $m^2/g$ to 2500 $m^2/g$, from 1000 $m^2/g$ to 2000 $m^2/g$, from 1200 $m^2/g$ to 3000 $m^2/g$, from 1200 $m^2/g$ to 2500 $m^2/g$, or from 1200 $m^2/g$ to 3000 $m^2/g$.

Another embodiment provides a method of making a composition comprising at least one carbonaceous material and at least one additive, comprising:

combining the at least one carbonaceous material with at least one additive precursor to form a mixture, wherein the at least one additive precursor comprises a metal ion selected from calcium, barium, potassium, magnesium, and strontium ion, and wherein the metal ion is present in an amount ranging from 0.5 wt. % to 3 wt. % relative to the total weight of the at least one carbonaceous material; and subjecting the mixture to at least one process selected from heat treatment and spray drying to form the composition.

In one embodiment, the at least one additive is derived from the at least one additive precursor containing the metal ion selected from calcium, barium, potassium, magnesium, and strontium. In one embodiment, the additive precursor can be a salt or other metal ion-containing material such as oxides, nitrides, and sulfides. In one embodiment, the additive precursor is a salt, which can be selected from nitrate, nitrite, carbonate, bicarbonate, acetate, phosphate, phosphite, sulfate, sulfite, lignosulfonate, citrate, tartrate, and gluconate salts of calcium, barium, potassium, magnesium, and strontium, or other salts known in the art. In one embodiment, the precursor is the additive itself, i.e., no conversion or reaction occurs upon forming the composition (e.g., composite). In another embodiment, the additive precursor can convert or react to form the at least one additive. For example, a carbon surface treated with an acetate salt may generate a carbon surface having the acetate salt itself, i.e., the precursor is the additive. In another example, a carbon surface can be treated with an acetate salt that may partially or wholly be converted to a carbonate salt, i.e., the acetate salt is a precursor of the carbonate salt additive. The amount of additive precursor combined with the at least one carbonaceous material may be less than 0.5 wt% with respect to the carbonaceous material where the carbonaceous material inherently contains the desired metal ion, so long as the final amount of metal ion in the composition ranges from 0.5 wt. % to 3 wt. %.

The at least one carbonaceous material and at least one additive precursor (which can be the same or different from the additive itself) can be combined to form a mixture, which can be a slurry, a paste, or a dry blend. For example, a solution comprising the precursor can be prepared prior to or simultaneously with combining the precursor with the carbonaceous material. Alternatively, a dry blend can be formed followed by the addition of a liquid vehicle to form the slurry or paste. The liquid vehicle can be selected from water, organic solvents (e.g., water miscible), or mixtures thereof (e.g., an aqueous solution). Following the combining step, the mixture can then be subjected to at least one process selected from heat treatment and spray drying to form the composition (e.g., a composite).

In one embodiment, the mixture is subjected to heat treatment. In one embodiment, the heat treatment can comprise heating a mixture of the carbonaceous material and precursor (which can be the same or different from the additive itself). In one embodiment, the heating is performed at one or more temperatures ranging from 25° C. to 2000° C., from 25° C. to 1000° C., e.g., from 25° C. to 750° C., from 25° C. to 500° C., from 25° C. to 250° C., from 25° C. to 100° C., 30° C. to 2000° C., 30° C. to 1000° C., from 30° C. to 750° C., from 30° C. to 500° C., from 30° C. to 250° C., from 30° C. to 100° C., from 50° C. to 2000° C., from 50° C. to 1000° C., from 50° C. to 750° C., from 50° C. to 500° C., from 50° C. to 250° C., from 50° C. to 100° C., from 100° C. to 2000° C., from 100° C. to 1000° C., from 100° C. to 750° C., from 100° C. to 500° C., or from 100° C. to 250° C. In another embodiment, following the combining, the mixture can be dried at room temperature.

The heating can be performed at a single temperature (e.g., any of the temperatures disclosed herein) or at more than one temperature, e.g., heating at one or more single temperatures or heating while ramping the temperature up or down, either continuously or stepwise. The heating can be performed for one or more time periods, each time period ranging from (or the total time period ranging from) 5 min or 1 h to days, e.g., at least 5 min, at least 15 min, at least 30 min, at least 1 h, at least 2 h, at least 4 h, at least 6 h, at least 12 h, at least 24 h, from 5 min to 24 h, from 5 min to 12 h, from 5 min to 4 h, from 5 min to 2 h, from 5 min to 1 h, from 15 min to 24 h, from 15 min to 12 h, from 15 min to 4 h, from 15 min to 2 h, from 15 min to 1 h, from 30 min to 24 h, from 30 min to 12 h, from 30 min to 4 h, from 30 min to 2 h, from 30 min to 1 h, from 1 h to 24 h, from 1 h to 12 h, from 1 h to 6 h, from 1 h to 4 h, from 1 h to 12 h. The mixture can be subjected to a continuous temperature increase (e.g., an increase of 5° C./min or less, 10° C./min or less, 15° C./min or less, or ranging from 5° C./min to 15° C./min) or can be inserted into an oven or furnace, or subjected to a hot gas flow or other heating element at one or more desired temperatures.

In one embodiment, the heating is performed under inert conditions, e.g., under a static inert gas conditions or under an inert gas purge (e.g., a nitrogen or argon purge).

In one embodiment, the mixture is subjected to spray drying. In one embodiment, "spray drying" refers to a method of vaporizing the mixture in a liquid form (e.g., a suspension) containing the carbonaceous material and additive precursor (which may be the additive itself) under conditions effective to vaporize the liquid mixture. The spray drying or subsequent processes can either form an initial intimate mixture of carbonaceous material and additive (or additive precursor), or can form a composite comprising the carbonaceous material and additive (or additive precursor). The spray drying can be performed with spray dryers, spray conversion reactors, spray pyrolysis reactors, or other instruments as known in the art. Spray drying can occur over a time period of at least about 1 s, e.g., at least 3 s, at least about 20 s or at least about 100 s, or over a time period ranging from 1 s to 2 min., from 3 s to 2 min., from 20 s to 2 min., from 1 s to 60 s, from 3 s to 60 s, or from 20 s to 60 s.

The spray drying can be performed with a heat treatment process, either sequentially or simultaneously. In one embodiment, the spray drying is performed simultaneously with the heat treatment, where the method further comprises spraying at elevated temperatures, such as the heat treatment temperatures disclosed herein. The spray drying and heat treatment, whether simultaneous or sequential, can be performed with a spray dryer or a spray conversion reactor. In a spray conversion reactor, droplets of the liquid mixture or suspension are entrained in a carrier gas and passed through a high temperature furnace for a time no longer than 100 seconds under conditions effective to cause the liquid mixture or suspension to vaporize. In certain embodiments, the high temperatures are sufficient to generate the composition (e.g., a composite). In other embodiments, as the solvent vaporizes from the droplets, an intimate mixture of additive precursors disposed on the carbonaceous materials. After the resulting particulate mixture is collected from the spray drying, it can be subjected to a heat treatment in inert or reducing atmosphere at the heat treatment temperatures disclosed herein to form the composition (e.g., a composite).

In one embodiment, no further treatment (e.g., drying or heat treatment) is performed on the product of the spray drying, which can be incorporated into electrode compositions as is, as described herein.

In one embodiment, the composition (e.g., particulate composite) is a powder. In another embodiment, the composition (e.g., the powder) can be further compressed, molded, or otherwise processed to an otherwise compressed form such as a pellet, e.g., the product of spray drying and/or heat treatment can be subjected to a pelletizing process in any manner known in the art.

In one embodiment, the composition is an electrode composition in which the electrode composition coats an electrode plate or current collector. The composition can be combined with other components to form electrodes for lead acid batteries. Accordingly, another embodiment provides:

a composition comprising (or consisting essentially of, or consisting of) at least one carbonaceous material and at least one additive, wherein the at least one additive comprises a metal ion selected from calcium, barium, potassium, magnesium, and strontium ion, and wherein the metal ion is present in an amount ranging from 0.5 wt. % to 3 wt. % relative to the total weight of carbonaceous material; and at least one lead-containing material.

The composition can further comprise one or more additional components as described herein, e.g., one or more of an organic molecule expander, $BaSO_4$, and/or $H_2SO_4$.

In one embodiment, the lead-containing material is selected from lead, PbO, $Pb_3O_4$, $Pb_2O$, and $PbSO_4$, hydroxides thereof, acids thereof, and other polymetallic lead complexes thereof. A source of the lead-containing material can be leady oxide, which comprises primarily PbO and lead. During manufacture of the electrode composition, $PbSO_4$ is generated in a reaction between the leady oxide and $H_2SO_4$.

In one embodiment, the carbonaceous material containing the at least one additive is present in the composition in an amount (loading) ranging from 0.05% to 3% by weight, relative to the total weight of the composition, e.g., an amount ranging 0.1% to 3%, from 0.1% to 2.5%, from 0.1% to 2%, from 0.1% to 1.5% from 0.1% to 1%, from 0.1% to 0.5%, from 0.2% to 3%, from 0.2% to 2.5%, from 0.2% to 2%, from 0.2% to 1.5% from 0.2% to 1% from 0.2% to 1%, or from 0.1% to 0.5% by weight, relative to the total weight of the composition.

The electrode composition can further comprise other components including one or more of least one organic molecule expander, $H_2SO_4$, and $BaSO_4$. In one embodiment, the electrode composition comprises at least the lead-containing material and carbonaceous material/additive composition (e.g., composite) interspersed (e.g., homogeneously interspersed) with each other, e.g., the composition (e.g., composite) comprising the carbonaceous material, the at least one additive, and the lead-containing are particulate. In one embodiment, none of the components of the mixture are provided as layers or coatings. In one embodiment, other components of the electrode composition (e.g., $BaSO_4$ and/or $H_2SO_4$) are homogeneously interspersed with the lead-containing material and carbon additive.

"Organic molecule expander" as defined herein is a molecule capable of adsorbing or covalently bonding to the surface of a lead-containing species to form a porous network that prevents or substantially decreases the rate of formation of a smooth layer of $PbSO_4$ at the surface of the lead-containing species. In one embodiment, the organic molecule expander has a molecular weight greater than 300 g/mol. Exemplary organic molecule expanders include lignosulfonates, lignins, wood flour, pulp, humic acid, and wood products, and derivatives or decomposition products thereof. In one embodiment, the expander is selected from lignosulfonates, a molecule having a substantial portion that contains a lignin structure. Lignins are polymeric species comprising primarily phenyl propane groups with some number of methoxy, phenolic, sulfur (organic and inorganic), and carboxylic acid groups. Typically, lignosulfonates are lignin molecules that have been sulfonated. Typical lignosulfonates include the Borregaard Lignotech products UP-393, UP-413, UP-414, UP-416, UP-417, M, D, VS-A (Vanisperse A), VS-HT, and the like. Other useful exemplary lignosulfonates are listed in, "Lead Acid Batteries", Pavlov, Elsevier Publishing, 2011, the disclosure of which is incorporated herein by reference. In one embodiment where the at least one additive comprises at least one metal lignosulfonate, the organic molecule expander is different from the at least one metal lignosulfonate. For example, the at least one additive can comprise calcium lignosulfonate and the organic molecule expander can comprise sodium lignosulfonate.

In one embodiment, the organic molecule expander is present in the electrode composition in an amount ranging from 0.1% to 1.5% by weight relative to the total weight of the composition, e.g., from 0.2% to 1.5% by weight, from 0.2% to 1% by weight, from 0.3% to 1.5% by weight, from 0.3% to 1% by weight, or from 0.3% to 0.8% by weight.

In one embodiment, both the carbonaceous material/additive composition (e.g., composite) and the organic molecule expander are present in the electrode composition in an amount ranging from 0.1 to 5% by weight relative to the total weight of the composition, e.g., from 0.1% to 4%, from 0.1% to 3%, from 0.1% to 2%, from 0.1% to 1.5% by weight. In another embodiment, the carbonaceous material/additive composition (e.g., composite) is present in an amount ranging from 0.2% to 1.5% by weight relative to the total weight of the electrode composition, e.g., from 0.3% to 1.5% by weight, and the organic molecule expander is present in an amount ranging from 0.2% to 1.5% by weight, from 0.3% to 1.5% by weight, from 0.2% to 1% by weight, or from 0.3% to 1% by weight.

In one embodiment where the electrode composition comprises $H_2SO_4$, the at least one additive forms a sulfate salt having a low solubility in aqueous or acidic solution. Without wishing to be bound by any theory, a sulfate salt that is insoluble in water or acid solution maintains an appreciable amount of the metal ion on the carbon surface. In contrast, a sulfate salt that is soluble in acid or water can be removed from the surface over time due to dissolution, thereby partially or wholly reverting the carbon (or a portion of the carbon surface) back to unmodified form. In one embodiment, the at least one additive is a sulfate salt having a solubility in water of 50 g/100 g water or less, e.g., a solubility of 40 g/100 g water or less, 35 g/100 g water or less, 30 g/100 g water or less, 25 g/100 g water or less, 20 g/100 g water or less, 15 g/100 g water or less, 10 g/100 g water or less, 5 g/100 g water or less, or 1 g/100 g water or less.

Another embodiment comprises an electrode comprising the compositions disclosed herein, e.g., a composition comprising at least one carbonaceous material and at least one additive wherein the at least one additive comprises a metal ion selected from calcium, barium, potassium, magnesium, and strontium ion, and wherein the metal ion is present in an amount ranging from 0.5 wt. % to 3 wt. % relative to the total weight of carbonaceous material. The electrode can comprise an electrode plate coated with the electrode composition. The electrode can be an anode. Another embodiment comprises a cell or lead acid battery comprising the electrode or composition disclosed herein. The lead acid battery can further comprise an electrolyte comprising at least one electrolyte additive selected from zinc, sodium, and potassium ions. In one embodiment, the at least one electrolyte additive is present in the electrolyte in an amount ranging from 0.1 to 3 wt. %, relative to the total weight of the electrolyte.

Another embodiment provides a method of making an electrode composition. In one embodiment, the method comprises combining the carbonaceous material/additive composition (e.g., composite) with the lead-containing material, expander, and optionally other components, e.g., $BaSO_4$ and $H_2SO_4$. In one embodiment, one or more of the lead-containing material, expander, and $BaSO_4$ can be added as a dry mixture and combined with, or with subsequent addition of, sulfuric acid and/or water (either simultaneously or sequentially in any order) to this dry mixture. In another embodiment, the method comprises combining a lead-containing material, an organic molecule expander, $BaSO_4$, and subsequently sulfuric acid and/or water (either simultaneously or sequentially in any order), to form a slurry. The method further comprises combining the slurry with the carbonaceous material/additive composition (e.g., composite). The carbonaceous material/additive composition can be either prewetted with water or sulfuric acid prior to combining with the slurry. Regardless of the method used, the result is an intermediate in the form of a paste or slurry that can be used to coat a substrate.

In one embodiment, the carbonaceous material/additive composition (e.g., composite) is prewetted with either water or $H_2SO_4$ prior to combining with a NAM (negative active mass) material, e.g., a NAM material for lead-acid batteries. One skilled in the art can determine the amount of water or acid needed for prewetting based on the amount of carbonaceous material added. In one embodiment, for a water-prewetted material, the ratio of composition (e.g., composite) to water ranges from 1:1 to 1:3 by weight. The acid-prewetting step can be performed according to any method known in the art, e.g., by adding the acid dropwise to the composition (e.g., composite). In another embodiment, the composition (e.g., composite is slowly added to a volume $H_2SO_4$, which is also typically present in a NAM paste. The $H_2SO_4$ can have a density ranging from 1.05 g/cm$^3$ to 1.5 g/cm$^3$.

In another embodiment, the carbonaceous material/additive composition (e.g., composite) comprises water. In one embodiment, this composition is a "wet" powder in which the water is contained or primarily contained in the pores of the carbonaceous material. The resulting wet powder behaves more like a powder as opposed to a dispersion or slurry. In certain cases, the wet powder is more easily dispersible compared to the dry powder. The presence of water in the pores of the carbonaceous material allows elimination of a prewetting step, and the carbonaceous material/additive composition can be incorporated into the electrode composition as is. The wet powder can be prepared during the preparation of the carbonaceous material/additive composition (e.g., composite). For example, the additive can be water-soluble (e.g., a metal salt such as a metal lignosulfonate) and a solution of the additive can be combined with the carbonaceous material in sufficient amounts to form the wet powder. Accordingly, one embodiment provides a composition comprising (or consisting essentially of, or consisting of):

at least one carbonaceous material present in an amount ranging from 40% to 45% by weight relative to the total weight of the composition;

water in an amount ranging from 45% to 55% by weight relative to the total weight of the composition; and the remainder of the composition comprising at least one additive, wherein the at least one additive comprises a metal ion selected from calcium, barium, potassium, magnesium, and strontium ion, and wherein the metal ion is present in an amount ranging from 0.5 wt. % to 3 wt. % relative to the total weight of carbonaceous material.

The wet powder composition can be directly combined with a lead-containing material, organic molecule expander, and other components such as $BaSO_4$ and $H_2SO_4$ to form the electrode composition. Alternatively, the wet powder composition can be stored under conditions to preserve the water content and later combined with the lead-containing material, organic molecule expander and optionally other components to form the electrode composition.

In one embodiment, the electrode composition, as a paste or slurry, is deposited onto a substrate, e.g., an electrode plate or current collector, such as a grid and allowed to dry on the substrate to form the electrode. In one embodiment, the grid is a metallic structures that come in a myriad of designs and shapes (e.g., punched or expanded from sheets), functioning as the solid permanent support for the active material. The grid also conducts electricity or electrons to and away from the active material. Grids can comprise pure metals (e.g., Pb) or alloys thereof. The components of those alloys can comprise Sb, Sn, Ca, Ag, among other metals described in "Lead Acid Batteries," Pavlov, Elsevier Publishing, 2011, the disclosure of which is incorporated herein by reference.

In one embodiment, after deposition onto the substrate, the paste intermediate is dried. In one embodiment, the drying is achieved by a slow cure, such as under controlled humidity conditions and a moderate amount of heat (e.g., from 30° C. to 80° C. or from 35° C. to 60° C.) under controlled humidity, resulting in a porous solid. The curing step can then followed by a second heating step (drying) at an elevated temperature (e.g., from 50° C. to 140° C. or from 65° C. to 95° C.) at extremely low humidity, or even zero humidity. In one embodiment, the composition is a monolith. Other pasting, curing, and formation procedures are described in "Lead Acid Batteries," Pavlov, Elsevier Publishing, 2011, the disclosure of which is incorporated herein by reference.

Another embodiment provides a composition (e.g. composite) comprising a carbonaceous material and a lignosulfonate salt. As mentioned above, organic molecule expanders based on sodium lignosulfonates or humic acids are frequently added to the electrode plate formulations. It has been discovered that a composition comprising carbonaceous materials and certain metal lignosulfonate salts can result in deposition of the metal salt onto the carbon surface. Moreover, the metal lignosulfonate can function as an inherent organic molecule expander, such that composition (e.g., composite) formation and electrode paste preparation process are combined in one step, with the overall process being simplified. It has also been discovered that certain such compositions (e.g., composites) have higher dispersibility in the electrode paste formulation, which is believed to be due to the polyelectrolyte nature of the lignosulfonate.

Accordingly, one embodiment provides a composition (e.g., composite) comprising, consisting essentially of, or consisting of at least one carbonaceous material and at least one metal lignosulfonate, wherein the at least one metal lignosulfonate is selected from calcium, barium, potassium, magnesium, and strontium lignosulfonates, and the metal ion of the at least one metal lignosulfonate is present in an amount ranging from 0.5 wt. % to 3 wt. % relative to the total weight of carbonaceous material.

In one embodiment, the composition comprises composite particles comprising the at least one carbonaceous material having on its surface the at least one metal lignosulfonate. For example, the metal lignosulfonate coats (either partially or wholly) particles of the carbonaceous material. As a result, the particles of carbonaceous material are interspersed (e.g., homogeneously interspersed) with the at least one metal lignosulfonate. The composite can be a powder or can be in compressed form, e.g., pellets. Such composite particles can be incorporated into an electrode composition with the methods described herein. Accordingly, another embodiment provides a composition (e.g., an electrode composition) comprising (or consisting essentially of, or consisting of):

composite particles comprising at least one carbonaceous material and at least one metal lignosulfonate, wherein the at least one metal lignosulfonate is selected from calcium, barium, potassium, magnesium, and strontium lignosulfonates, and the metal ion of the at least one metal lignosulfonate is present in an amount ranging from 0.5 wt. % to 3 wt. % relative to the total weight of carbonaceous material; and at least one lead-containing material.

The electrode composition can further comprise one or more additional components as described herein, e.g., one or more of an organic molecule expander, $BaSO_4$, and/or $H_2SO_4$.

Prior to combining with the at least one lead-containing material (and other components), the composition (e.g., composite) comprising the carbonaceous material and metal lignosulfonate can also be prepared as a wet powder. In one embodiment, the composition comprising the carbonaceous material and metal lignosulfonate can further contain 45% to 55% water by weight, thereby avoiding a pre-wetting step. Accordingly, another embodiment provides the composition (e.g., composite) comprising (consisting essentially of, or consisting of):

at least one carbonaceous material present in an amount ranging from 40% to 45% by weight relative to the total weight of the composition;

at least one metal lignosulfonate selected from calcium, barium, potassium, magnesium, and strontium lignosulfonates, wherein the metal ion of the at least one metal lignosulfonate is present in an amount ranging from 0.5 wt. % to 3 wt. % relative to the total weight of carbonaceous material, and wherein the at least one metal lignosulfonate is present in an amount ranging from 5% to 10% by weight relative to the total weight of the composition; and water in an amount ranging from 45% to 55% by weight relative to the total weight of the composition.

In one embodiment, the composition (e.g., composite) can be used for electrodes (e.g., as coatings for electrode plates) and can further comprise the components described herein, e.g., lead-containing material, organic molecule expander, $H_2SO_4$, and $BaSO_4$. In one embodiment, the metal lignosulfonate of the composition (e.g., composite) functions as the organic molecule expander. In another embodiment, the composition or the composite comprises a second organic molecule expander, e.g., any of the expanders described herein other than the metal lignosulfonate of the composition (e.g., composite).

In one embodiment, the composition (e.g., composite) comprising metal lignosulfonates in combination with the carbonaceous material improved dispersibility in the electrode paste formulation. The polyelectrolyte nature of the lignosulfonate is believed to be responsible for dispersion improvement. In another embodiment, the composition (e.g., composite) improves particle performance when incorporated in a lead acid battery (e.g., the electrode) in which the presence of the calcium ions on the particle surface reduced water loss.

The composition (e.g., composite) can be prepared via a suspension containing the carbonaceous material with the metal lignosulfonate. Alternatively, a solution, e.g., an aqueous solution of the metal lignosulfonate (water soluble) can be combined with the carbonaceous material, e.g., the solution can be spray dried onto the carbonaceous material. In yet another embodiment, a suspension containing the carbonaceous material in a solution of the metal lignosulfonate can be spray dried as described above.

Another embodiment provides a method of preparing an electrode composition, comprising:

combining at least one lead-containing material and an organic molecule expander with a composition comprises at least one carbonaceous material and at least one additive, wherein the at least one additive comprises a metal ion selected from calcium, barium, potassium, magnesium, and strontium ion, and wherein the metal ion is present in an amount ranging from 0.5 wt. % to 3 wt. % relative to the total weight of carbonaceous material. In one embodiment, the composition is a composite comprising the at least one carbonaceous material and at least one additive.

In one embodiment, prior to the combining, the composition comprising the at least one carbonaceous material and the at least one additive provides the at least one carbonaceous material an amount ranging from 40% to 45% by weight relative to the total weight of the composition, and water in an amount ranging from 45% to 55% by weight relative to the total weight of the composition. In one embodiment, the at least one additive comprises the metal ion as a metal lignosulfonate, wherein the metal lignosulfonate is present in an amount ranging from 5% to 10% by weight, relative to the total weight of the composition.

In one embodiment, the combining comprises:

forming a mixture with the at least one lead-containing material and the organic molecule expander, and combining the mixture with the composition (e.g., a composite) comprising the at least one carbonaceous material and the at least one additive (e.g., a metal lignosulfonate).

Controlling water loss is one consideration in the design of low-maintenance or maintenance-free lead acid batteries.

Water loss in lead acid batteries largely occurs during charge and overcharge and typically results from evolution and/or grid corrosion of hydrogen on the negative plate and oxygen evolution on the positive plate. The addition of a carbonaceous material in the negative plates typically leads to increased water loss, the extent largely depending on the amount and type of carbon (e.g., surface area and morphology). In general terms, a relationship between the rate of hydrogen evolution and negative plate potential can be illustrated with the Butler-Vollmer equation:

$$I = -A \cdot i_0 \cdot \exp[-\alpha_c n F/RT(E-E_{eq})] \quad (1)$$

where the rate of hydrogen evolution is given by the (cathodic) current I; the (electrochemically active) surface area is given by A; $i_0$ is the exchange current density; n represents the number of electrons exchanged in the reaction; $\alpha_c$ is the symmetry factor for the reaction; $E_{eq}$ represents the equilibrium potential for the reaction; and E is the electrode potential during the overcharge conditions.

From equation (1), it can be seen that there are two material-specific parameters that affect the rate of hydrogen evolution: (i) material specific inherent activity of the electrode component toward the hydrogen evolution, as indicated by the exchange current density ($i_0$), and (ii) morphological properties of the material that influence the (electrochemically active) surface area A. In the case of the negative electrodes containing carbonaceous materials, hydrogen evolution can occur on both the lead and carbon surface. Relative contributions of individual components will be determined by their intrinsic activity (that is combination of inherent catalytic activity and surface area) at a given electrode potential.

One embodiment provides a cell or battery comprising an electrode plate coated with the composition (e.g., composite) disclosed herein, in which the cell or battery has reduced water loss (e.g., at least 10%) compared to a cell or battery containing an unmodified carbon. Water loss can be measured as weight loss after overcharging a battery at 14.4V for a period of time, e.g., at least 3, 4, or 6 weeks in a 60° C. water bath. The extent of water loss can depend on factors inherent to the electrode material, e.g., surface area of the composition, e.g., composite (carbonaceous material and metal ion additive), level of metal ion additive treatment (e.g., wt. % with respect to carbon), and loading in the paste formulation, in addition to other factors such as the positive and negative plate potentials during (over)charge, and the presence of certain metal impurities in the acid electrolyte, grids, and other electrode components. A cell or battery comprising an electrode containing an unmodified carbon typically results in increased water loss compared to a cell or battery without the unmodified carbon. The present composition reduces the level of water loss in the cell by at least 10%, at least 25%, at least 50%, at least 75%, or by at least 90%, compared to a cell or battery comprising an electrode containing the unmodified carbon. In one embodiment, the battery achieves reduced water loss over a period of at least 3 weeks by at least 10% (e.g., at least 25%, at least 50%, at least 75%, or by at least 90%) compared to a battery having an electrode plate comprising an unmodified carbonaceous material.

Without wishing to be bound by any theory, addition of carbon to the negative plate alters the electrode morphology. This alteration typically results in increased surface area of the negative plate A, which according to the equation (1), further results in an increased rate of hydrogen evolution and accelerated water loss. Without wishing to be bound by any theory, the increased surface area could result from the simple physical addition of carbon, which can be a high surface area component, or from an increased surface area of lead phase facilitated by addition of carbon particles to the negative plate. In the absence of other interactions (e.g., exchange current density ($i_0$) of individual components does not change as a result of mixing), the total hydrogen evolution rate and concomitant water loss can be largely determined by the partition of total (electrochemically) active surface area A between two phases, lead and carbon. However, it is also possible that the particles formed by lead and carbon phase could have different inherent rate of hydrogen evolution. Mitigation of the water loss therefore could proceed through several different paths. Without wishing to be bound by any theory, water loss mitigation could be achieved by modification of inherent activity of carbon after addition of moieties blocking the surface sites for proton adsorption, intermediate step in hydrogen evolution. Alternatively, interaction between lead and carbon could be changed with addition of such species. This modification could be selectively aimed at reduction of electrochemically active surface area A, or at selective modification of inherent (electrocatalytic) activity of carbon surfaces for hydrogen evolution.

EXAMPLES

Example 1

This Example describes the preparation of a composite comprising carbon black and a calcium salt.

$Ca(CH_3CO_2)_2 \cdot xH_2O$ (3 g, 5.52 wt. % hydration water content) was dissolved in 125 g water. This solution was slowly added to 50 g carbon black (PBX® 51 carbon additive, Cabot Corporation) with stirring. The mixture was allowed to dry at room temperature for a few days or overnight in a 60° C. oven.

The dried mixture was then heat treated according to the following protocol:
  subject the mixture to a room temperature $N_2$ purge (2 L/min) for 1-2 h;
  increase the temperature at a rate of 10° C./min to achieve a 150° C. $N_2$ purge and allow mixture to sit under $N_2$ purge for 1 h;
  increase the temperature at a rate of 10° C./min to achieve a 500° C. $N_2$ purge and allow mixture to sit under $N_2$ purge for 2 h; and
  cool under $N_2$.

The resulting product is a composite comprising carbon black having 1 wt. % calcium in the form of $CaCO_3$, as indicated by the formation of a water insoluble calcium salt on the surface of the carbon black (Sample A). The $N_2$ BET surface area of Sample A was determined to be 1465 m²/g.

The same procedure was repeated with carbon black and 7.5 g $Ca(CH_3CO_2)_2 \cdot xH_2O$ to produce a composite comprising carbon black and $CaCO_3$, resulting in a calcium content of 2.5 wt. % (Sample B).

The same procedure was repeated with carbon black and 1 g $Ba(CH_3CO_2)_2$ in 125 g water to produce a composite comprising carbon black and $BaCO_3$, resulting in a barium content of 1 wt. % (Sample C).

Example 2

This Example describes the preparation of pellets comprising composites of carbon black and calcium lignosulfonate.

Pellets were prepared with a 4 L plow mixer (Processall, 4H/V Tilt-A-Mix® mixer), at a temperature of 65° C. The mixing rate was set to 100 rpm, and the mixer was loaded with 200 g PBX® 51 carbon black. With plow turning, the spray addition unit was charged with 260 g of a solution of 13.3 wt. % calcium lignosulfonate ("CaLS"; Aldrich) and pressurized to 17 psi nitrogen. Upon reaching the desired pressure, an addition valve from the spray addition unit was opened to introduce a spray of the calcium lignosulfonate solution to the surface of the carbon. Upon completion of the spray, the product was mixed for an additional 5 min and discharged from the mixer. The sample was dried in the oven at 100° C. to 110° C. overnight (or 12-18 hours).

Table 1 below shows the properties of the carbon black-calcium composite compared with PBX® 51 carbon black ("CB"). The amount of calcium added was calculated based on 5 wt. % calcium in calcium lignosulfonate. The calcium content was determined by AES-ICP, which represents the total amount of calcium present in the composite.

TABLE 1

| Sample | CaLS sol'n concentration [wt %] | Wt. [g] Added Ca sol'n/ 100 g CB | ICP measured Ca [ppm] | Measured $N_2$ BET SA [$m^2$/g] |
|---|---|---|---|---|
| CB | N/A | N/A | N/A | 1650 | 1420.0 |
| Sample D | 4.3 | 120 | 2500 | 4210 | 1358.6 |
| Sample E | 9.2 | 120 | 5000 | 5920 | 1280.2 |
| Sample F | 13.3 | 130 | 7500 | 7540 | 1160.0 |

Example 3

This Example describes cyclic voltammetry (CV) measurements of calcium-carbon black composites.

CV measurements were taken of three samples: unmodified carbon black (PBX® 51 carbon additive, Cabot Corporation; "CB"), Sample A from Example 1, which is a composite comprising carbon black and 1 wt. % calcium, and Sample E from Example 2, which is a composite comprising carbon black and 0.5 wt. % calcium from calcium lignosulfonate. For each of the three carbon black samples, a 5 wt. % solids slurry was prepared by mixing the carbon black or composite (0.45 g), with polyvinylenedifluoride (PVDF, 0.5 g of 10 wt. % solution in N-methylpyrrolidinone (NMP)), and NMP (9 g) for 20 minutes in a THINKY™ ARE-310 planetary mixer. Evaporating the NMP at 80° C. for 1h resulted in a dry solid containing 90 wt. % carbon black or composite, and 10 wt. % PVDF.

Graphite rods were coated with 40 μL of the slurry, resulting in a coating amount of 2.75+/0.05 mg. The coated graphite rods were used as a working electrode in a three electrode jacketed electrochemical cell using uncoated graphite rod as counter electrode and standard calomel electrode (SCE) as a reference electrode. The cell temperature was maintained at 60° C. by water circulation, and cyclic voltammetry (CV) experiments were conducted by scanning the working electrode at 10 mV/s from equilibrium potential to +0.4V then −0.8V vs. SCE for 3 cycles. The third CV cycle was used to compare the carbon blacks and referred as the "final" CV cycle herein. The plots were normalized to the capacitive current at +0.4V to allow a comparison of all the currents at the same electrochemical surface area. This eliminates the effect of variations in coating weight or BET specific surface area of the carbon blacks.

FIG. 1 shows the final CV cycles for each of the three CB coated rods (normalized current [mA/mA] vs. voltage, [V]). On the negative sweep, proton adsorption and reduction processes are present in addition to the capacitive current. It can be seen from FIG. 1 that the hydrogen reduction current is lower for both composite samples (Sample A and Sample E) compared to the CB sample. Table 2 shows the values for % current at −0.6 V, in which hydrogen evolution current was decreased by approximately 20% at −0.6V vs. SCE.

TABLE 2

| Sample | Additive | % Current (0.6 V) |
|---|---|---|
| CB | — | 100.0 |
| Sample A | 1 wt. % Ca | 84.9 |
| Sample E | 0.5 wt. % Ca from CaLS | 80.2 |

Since hydrogen evolution is the driving force in overcharge current for lead-acid batteries containing carbon black in the negative plates, overcharge current and water loss are expected to be reduced by the composites according to the claimed invention.

Example 4

This Example describes rotating disc electrode (RDE) measurements of the following samples: unmodified carbon black (PBX® 51 carbon additive, Cabot Corporation; "CB"), Sample A from Example 1, which is a composite comprising carbon black and 1 wt. % calcium, Sample B from Example 1, which is a composite comprising carbon black and 2.5 wt. % calcium, and Sample C from Example 1, which is a composite comprising carbon black and 1 wt. % barium. Slurries (4 mg/mL) were prepared by adding 20 mg of each sample in a 4 mL:1 mL $H_2O$:isopropanol (IPA, HPLC grade) mixture, followed by sonication for 1 minute.

Electrodes were prepared by coating polished glassy carbon electrodes with 25 μL of the carbon black-containing solution. After drying (~1 min. at 25° C.), 12 μL of 0.05 wt. % Nafion solution was added as binder on top of the electrode, and the electrode was dried under nitrogen for 1 h at 25° C.

Rotating disc electrode (RDE) measurements were performed with a BiStat potentiostat (Princeton Applied Research) controlling a Pine Speed control and Pine Analytical rotator (Pine Research Instrumentation) interfaced via PC using EC-Lab® v10.21 software. A three electrode glass cell (Pine Research Instrumentation) was used with a platinum wire counter-electrode, calomel reference electrode, and glassy carbon working electrode coated with 100 μg of the carbon black samples under investigation.

The electrolyte (0.5 M $H_2SO_4$) was purged with argon for 20 min. prior to measurement. Hydrogen reduction currents were measured at 50° C. during cyclic voltammetry scans at 20mV/s, from −0.3 to −1V vs. SCE with 3,000 rpm disc rotation speed. The reported currents were read at −0.65V vs. SCE (corresponding to −0.4V vs. Standard Hydrogen Electrode (SHE)), normalized by the weight of carbon black, and measured once a steady-state was achieved. Pre-formation cycles at 100 mV/s (usually less than 10 cycles) were performed to achieve steady state of the CV current. The hydrogen evolution current was measured at 25° C., 35° C., and 50° C.

Figure 2:
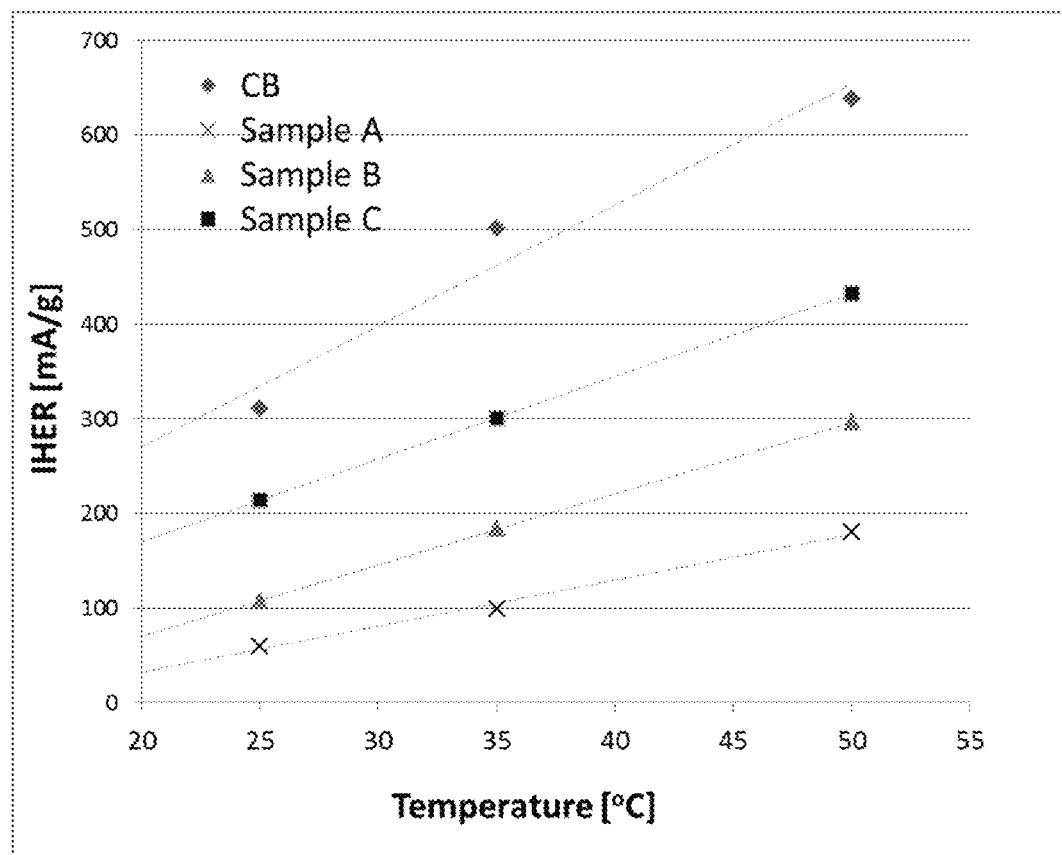
FIG. 2 is a plot of hydrogen evolution reaction (HER) in mA/g versus temperature (° C.) for the composites of Example 4 in comparison to an unmodified carbon black.

FIG. 2 is a plot of hydrogen evolution reaction (HER) current in mA/g versus temperature (° C.). The data indicates that each of Samples A-C showed lowered hydrogen evolution current compared to the unmodified carbon black at each temperature. Again, the lowered hydrogen evolution likely indicates overcharge current and water loss would be expected to be reduced by the composites according to the claimed invention.

Example 5

This Example describes the measurement of overcharge current for single cells containing carbon black or Sample A of Example 1 in the negative electrode at loadings for each of 0 wt. %, 0.25 wt. % and 0.5 wt. % with respect to leady oxide in negative paste mix.

Negative active mass (NAM) paste mixing was done at 1 kg scale. PbO (1 kg) was added into an Eirich EL1 mixer and mixed for 1 min, followed by the addition of Vanisperse A (2 g for 0.2 wt. %) and barium sulfate (8 g for 0.8 wt. %). The carbon black or composite (5 g for 0.5 wt. %), pre-wetted with 12 g water, was then added to the mixer and mixed for 3 min, followed by the addition of water (140 mL) and additional mixing for 10 min. Finally, sulfuric acid (80 mL, 1.4 g/cm$^3$) was added slowly over a 13 min period with the addition of extra water as needed to adjust consistency. The paste was then mixed for 25 min. A control positive electrodes paste was made according to the same procedure but without carbon black.

Electrodes were hand-pasted with 22 g wet paste on a 5.5×5 cm$^2$ Pb—Sn—Ca alloy grid (98.86% lead, 1.1% tin and 0.04% calcium). Electrodes were cured in a Tenney TR2C humidity controlled oven. The curing protocol was the same for positive and negative plates: 72h at 35° C., 95% RH, followed by 24 h at 60° C., 10% RH. The NAM weight after curing was typically 20 g per plate.

Cells were assembled by torch welding two negative and three positive plates together. Positive plates were wrapped in commercially available automotive polyethylene-rubber separator (Daramic DRCM-200A328). Electrode and separator stacks were inserted in polymethylmethacrylate cases and compressed with Nylon mesh shims. Case lids were screwed on with 2 mm diameter vent openings. Completed cells were 2V, 4.6 Ah nominal capacity, single cells.

Formation was performed in case with 1.18 g/cc sulfuric acid (typically 85 mL). The formation algorithm included 9 charging steps, for a total duration of 65h and total capacity of 26.76 Ah. The electrolyte density target after formation was 1.28 g/cc.

After formation, cells were pre-conditioned by the following sequence: full charge, C20 capacity, full charge, cold crank test, full charge, C20 capacity, full charge, and cold crank test. C20 is a low current discharge of 0.05×Cn at 25° C., and cold crank is a high current discharge of 5×Cn at −18° C. Cn is the nominal capacity.

After pre-conditioning, the electrolyte volume was readjusted with 1.28 g/cc sulfuric acid. The cells were weighed and placed in a water bath heated to 60° C. The cell voltage was readjusted to 2.4V with 0.5 A current and maintained at 2.4V for 3 weeks duration. Cell weight loss was measured weekly, and cell overcharge current was monitored during the entire test.

Overcharge capacity of the cells was calculated by integrating the overcharge current over the overcharge time. Table 3 shows overcharge capacity data over 3 weeks of overcharge tests for cells containing either unmodified carbon black or a composite (Sample A, 1 wt. % calcium).

TABLE 3

| Sample | Carbon or Composite Loading (wt. %) | 3 weeks overcharge [Ah] |
|---|---|---|
| CB, control | 0% | 15.0 |
| CB | 0.25% | 36.6 |
| CB | 0.5% | 64.4 |
| Sample A | 0.25% | 42.2 |
| Sample A | 0.5% | 40.0 |

Figure 3:
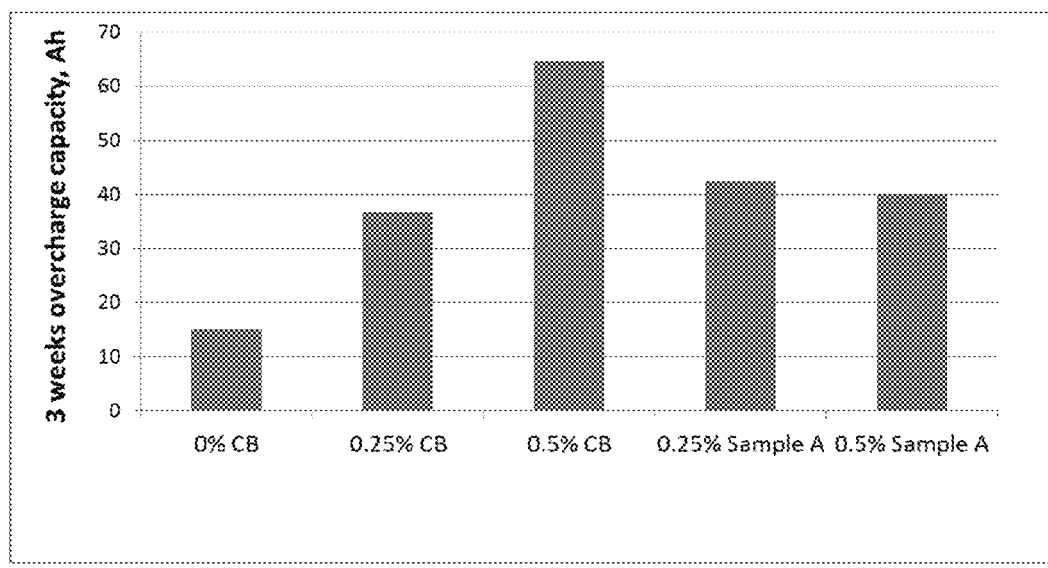
FIG. 3 is a plot of overcharge capacity (Ah) after 3 weeks versus carbon black loading for the single cells of Example 5.

This data is plotted in FIG. 3 (overcharge capacity [Ah] vs. CB loading [wt. %]). From Table 1 and FIG. 3, it can be seen that without Ca modification, the overcharge capacity increases steadily with carbon black loading. However when a composite comprising calcium additive is used on the carbon black, overcharge capacity is stabilized and the data suggests water loss would be lower for Sample A.

Example 6

This Example describes water loss with the single cells of Example 5.

The single cells were weighed weekly during the overcharge test. The total weight loss was normalized by dividing the weight loss by the nominal capacity of the cells. The total normalized weight loss after 3 weeks is reported in Table 4.

TABLE 4

| 3 weeks water loss (2.4 V, 60° C.) | g/Ah |
|---|---|
| 0% CB, control | 0 |
| 0.25% CB | 3.47 |
| 0.5% CB | 3.14 |
| 0.25% Sample A | 0.28 |
| 0.5% Sample A | 0.13 |

Water loss is deemed acceptable if less than 3 g/Ah after 6 weeks ("water loss test target"). It can be seen that for unmodified carbon black, the cells would not achieve the water loss test target. In contrast, cells containing the carbon black-calcium composites display more than 90% reduced weight loss, indicating that these cells would achieve the water loss test target.

Example 7

In this example, negative active mass (NAM) formulations were prepared and evaluated with an overcharge test, and water loss test. The formulations comprise carbon black (PBX® 51 carbon additive, Cabot Corporation, "CB") used as is, or combined with 17 wt. % (relative to CB) sodium lignosulfonate commercially available as Vanisperse A (VS-A) ("Sample G") or Sample F from Example 2 (0.75 wt. % Ca from calcium lignosulfonate). For Samples F and G, the samples were pelletized with the respective aqueous lignosulfonate solutions by using a custom-made batch pelletizer following a procedure similar to Example 2 to form carbon black-lignosulfonate composites. The samples CB-A, CB-B, Sample F, and Sample G were combined with additional Vanisperse-A and barium sulfate in the amounts listed in Table 5 (reported as wt. %).

TABLE 5

| Sample | CB or Composite | Ca added | Vanisperse-A | Total VS-A + CaLS | Barium sulfate |
|---|---|---|---|---|---|
| CB-A | 0.5 | 0 | 0.2 | 0.2 | 0.8 |
| CB-B | 0.5 | 0 | 0.4 | 0.4 | 0.8 |
| Sample G | 0.5 | 0 | 0.2 | 0.29 | 0.8 |
| Sample F | 0.5 | 0.75 | 0.2 | 0.27 | 0.8 |

The negative electrodes were prepared and formed as described in Example 5. The overcharge test was performed for 3 weeks on single 2V cells having 2 negative and 3 positive plates of 4.6 Ah average nominal capacity. Positive plates were wrapped in commercially available automotive polyethylene-rubber separator (Daramic® separators, DRCM-200A328). The electrolyte was a 1.28 g cm$^{-3}$ H$_2$SO$_4$ solution. Overcharge tests were performed at 2.4V in a 60° C. water bath.

Figure 4:
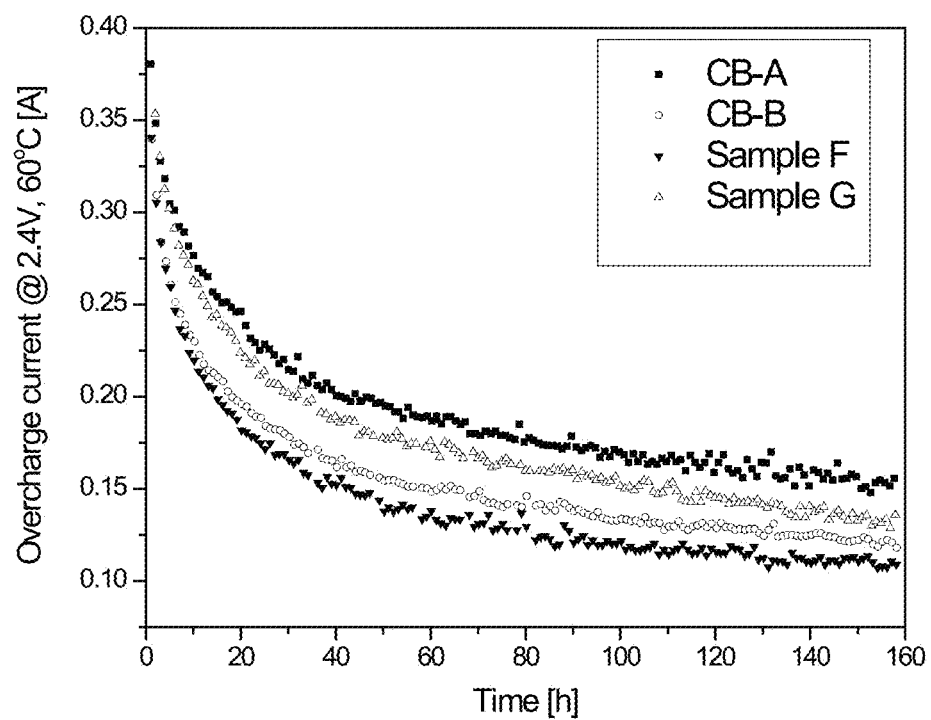
FIG. 4 is a plot of overcharge current (A) vs. time (h) at 2.4V, 60° C. for the formulations of Example 7.

FIG. 4 shows the evolution of overcharge current during one week overcharge as a plot of current vs. time at 2.4V, 60° C. for the formulations of Table 5. The highest overcharge current is observed for CB-A. The second highest overcharge current is observed for Sample G, a pellet of CB and VS-A where the total amount of VS-A was increased to 0.29% vs. 0.2% in CB-A. Further reduction in overcharge current can be observed with CB-B where the amount of VS-A lignosulfonate was increased to 0.4%. Finally, for the Sample F, in which VS-A lignosulfonate in the composite pellet is replaced by calcium lignosulfonate, the greatest reduction in overcharge current is observed, which strongly suggests the benefit of the calcium cation.

Figure 5:
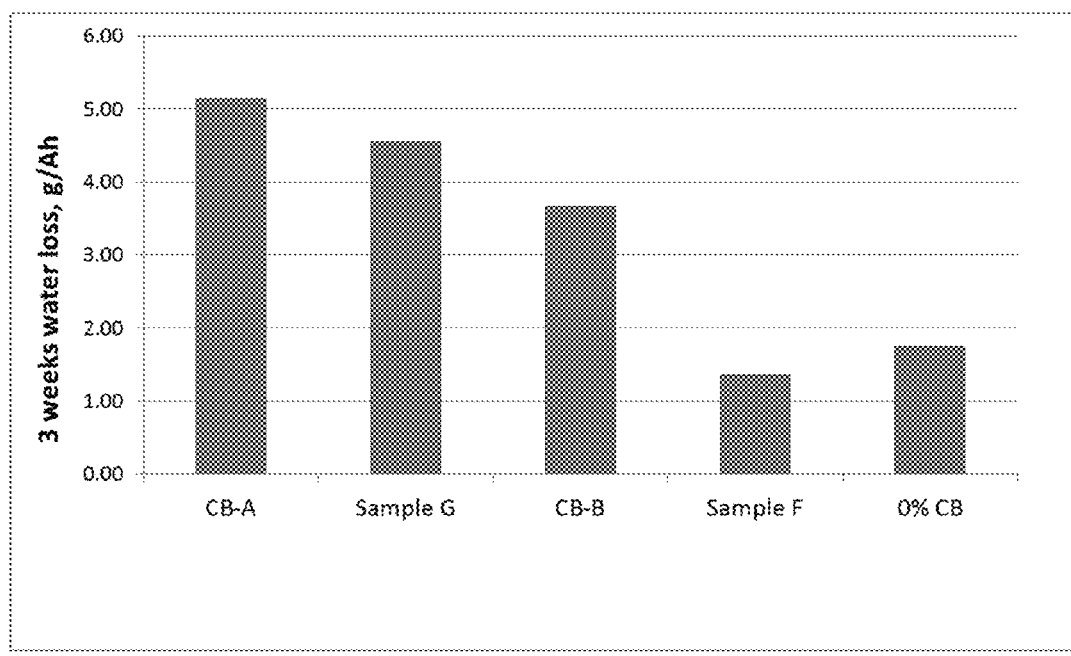
FIG. 5 is bar plot of 3 weeks water loss (g/Ah) for the formulations of Example 7.

The trend observed with the overcharge currents is the same for actual water loss (in g/Ah) of the cells measured over 3 week period (FIG. 5), where the cell with CaLS (Sample F) generates the least amount of water loss, which is a similar water loss amount as achieved with the control cell having no carbon additive.

Example 8

This Example describes the preparation of a wet powder sample. Pellets were prepared in a manner similar to Example 2, i.e., with a 4 L plow mixer (Processall, 4H/V Tilt-A-Mix® mixer), at a temperature of 65° C. The mixing rate was set to 100 rpm, and the mixer was loaded with 200 g PBX® 51 carbon black. With plow turning, the spray addition unit was charged with 260 g of a solution of 13.3 wt. % calcium lignosulfonate ("CaLS"; Aldrich) and pressurized to 17 psi nitrogen. Upon reaching the desired pressure, an addition valve from the spray addition unit was opened to introduce a spray of the calcium lignosulfonate solution to the surface of the carbon. Upon completion of the spray, the product was mixed for an additional 5 min and discharged from the mixer. The product was not dried. The resulting product was a wet powder having 50 wt. % water, 45 wt. % carbon black, and 5% CaLS ("Sample H").

Example 9

A wet powder sample was prepared in a manner similar to Example 8 but substituting a NaCa lignosulfonate (Borresperse Calif., available from Borregaard LignoTech) for the CaLS reagent. The mixer (130LD plowshare mixer) was loaded with 200 g PBX® 51 carbon black and the mixing rate was set to 95 rpm at room temperature. With plow turning, the spray addition unit was charged with 8.45 kg of 13.3% NaCa lignosulfonate solution charged through a hydraulic spray nozzle and pressurized to 80 psi nitrogen. Upon reaching the desired pressure, an addition valve from the spray addition unit was opened to introduce a spray of the calcium lignosulfonate solution to the surface of the carbon. Upon completion of the spray, the product was mixed for an additional 5 min and discharged from the mixer. The product was not dried. The resulting product was a wet powder having 50 wt. % water, 45 wt. % carbon black, and 5% NaCa lignosulfonate (Sample I).

Example 10

This Example describes water loss tests with the wet powder samples. Water loss tests were performed according to the method described in Example 6 with Sample H and Sample I. For comparison, water loss tests were also performed with Sample F from Example 2.

Negative active mass (NAM) paste mixing was performed at a 1 kg scale. PbO (1 kg) was added into an Eirich ELI_ mixer and mixed for 1 min, followed by the addition of Vanisperse A (3 g for 0.3 wt. %) and barium sulfate (8 g for 0.8 wt. %). The carbon black or composite (10 g for 0.5 wt. % due to 50% water contained), was added to the mixer and mixed for 3 min, followed by the addition of water (approximately 120 mL) and additional mixing for 10 min. Finally, sulfuric acid (80 mL, 1.4 g/cm3) was added slowly over a 13 min period with the addition of extra water as needed to adjust consistency. The paste was then mixed for 25 min. The results of the water loss tests are shown in Table 6 below.

TABLE 6

| 3 weeks water loss (2.4 V, 60° C.) | g/Ah |
|---|---|
| 0.5% Sample F (dry) | 0.25 |
| 0.5% Sample H | 0.25 |
| 0.5% Sample I | 1.2 |

Sample F and H, were both prepared with CaLS in the same manner except that Sample H was not dried and was used as is in the paste formulation. It can be seen from Table 6 that the water loss values are nearly identical for both Samples. Sample I, in which the carbon black is modified with NaCa lignosulfonate, provided significantly improved water loss values compared to the unmodified carbon black sample (0.5% CB in Table 4), albeit not to the same extent as Samples F and H.

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A composition comprising at least one carbonaceous material and at least one metal lignosulfonate, wherein the at least one metal lignosulfonate is selected from calcium, barium, potassium, magnesium, and strontium lignosulfonates, and the metal ion of the at least one metal lignosulfonate is present in an amount ranging from 0.5 wt. % to 3 wt. % relative to the total weight of the at least one carbonaceous material.

2. The composition of claim 1, wherein the composition comprises composite particles comprising the at least one carbonaceous material and the at least one metal lignosulfonate.

3. The composition of claim 1, wherein the composition is in the form of a powder or a pellet.

4. The composition of claim 1, wherein the at least one carbonaceous material is interspersed with the at least one metal lignosulfonate.

5. The composition of claim 1, wherein the at least one metal lignosulfonate comprises calcium lignosulfonate.

6. The composition of claim 1, further comprising at least one lead-containing material.

7. The composition of claim 6, wherein the lead-containing material is selected from lead, PbO, leady oxide, $Pb_3O_4$, $Pb_2O$, and Pb $SO_4$, hydroxides, acids, and metal complexes thereof.

8. The composition of claim 1, further comprising at least one organic molecule expander that is different from the at least one metal lignosulfonate.

9. The composition of claim 1, further comprising $BaSO_4$.

10. An electrode comprising an electrode plate coated with the composition claim 1.

11. A lead acid battery comprising the electrode of claim 10.

12. The composition of claim 1, wherein the composition comprises the at least one carbonaceous material present in an amount ranging from 40% to 45% by weight, relative to the total weight of the composition.

13. The composition of claim 1, wherein the at least one metal lignosulfonate is present in an amount ranging from 5-10% by weight, relative to the total weight of the composition.

14. The composition of claim 1, further comprising water in an amount ranging from 45-55% by weight, relative to the total weight of the composition.

* * * * *